Nov. 8, 1927.
G. A. CUMMINGS
1,648,579
DIRECTION INDICATOR
Filed Nov. 26, 1926
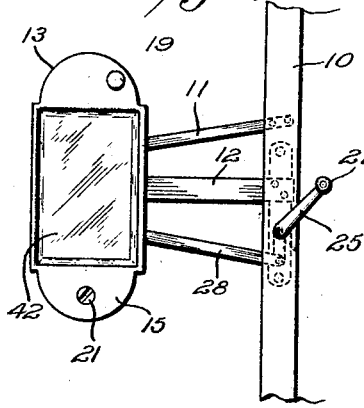
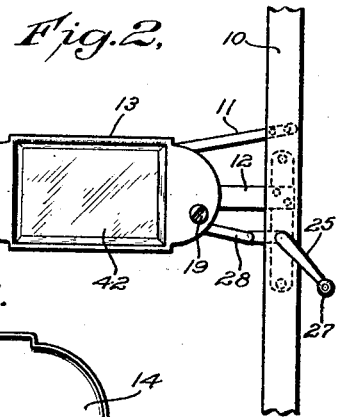
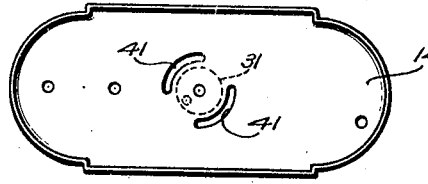
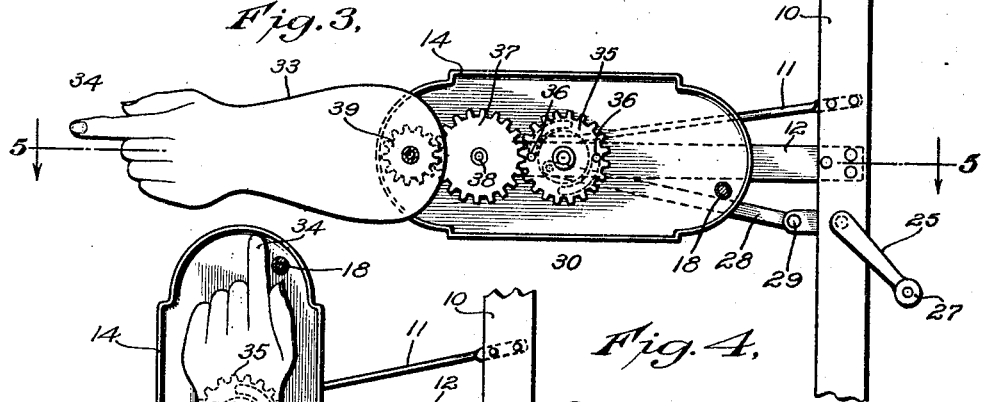
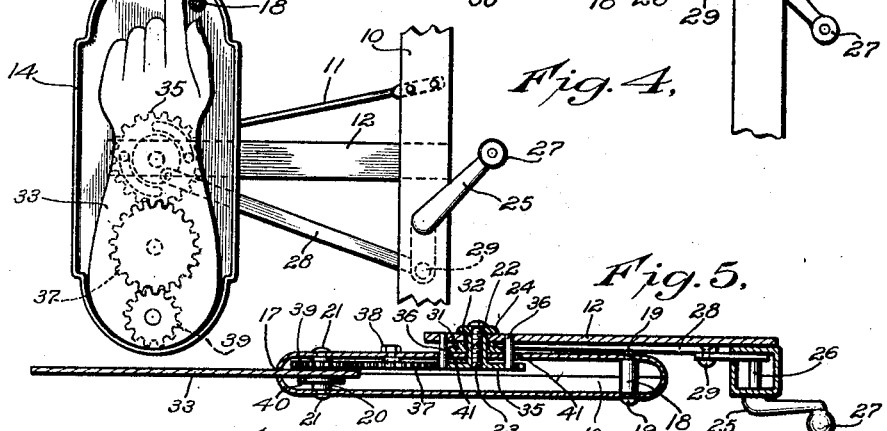
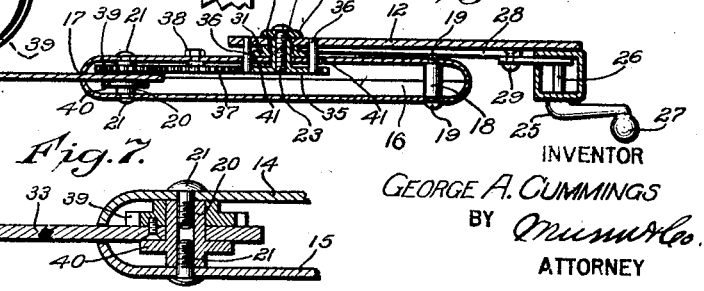
WITNESSES
E. A. Wilson
Chris Feinle
INVENTOR
GEORGE A. CUMMINGS
BY
ATTORNEY Patented Nov. 8, 1927.

1,648,579

UNITED STATES PATENT OFFICE.

GEORGE A. CUMMINGS, OF SPOKANE, WASHINGTON, ASSIGNOR TO EVERITE SIGNAL COMPANY, OF SPOKANE, WASHINGTON, A CORPORATION OF WASHINGTON.

DIRECTION INDICATOR.

Application filed November 26, 1926. Serial No. 150,824.

This invention relates to direction indicators for automobiles, and relates particularly to direction indicators of the type disclosed in United States Letters Patent No. 1,470,617, granted to me.

Some of the objects of the present invention are: to improve the construction of direction indicators of the character mentioned; to facilitate the assemblage of the parts; to lower the cost of manufacture; and to render devices of this character more reliable in operation, and easier to operate.

The nature of the invention and its distinguishing features and advantages will appear when the following specification is read in connection with the accompanying drawing, in which—

Figure 1 is an elevation of the direction indicator supported from a windshield of an automobile, a portion of the windshield being shown, and the indicator being in non-indicating condition.

Fig. 2 is a view similar to Fig. 1, but showing the indicator in an indicating condition.

Fig. 3 is a view similar to Fig. 2, on an enlarged scale, with one of the casing sections removed.

Fig. 4 is a view similar to Fig. 1, on an enlarged scale, with one section of the casing removed.

Fig. 5 is a sectional view taken on the line 5—5 of Fig. 3.

Fig. 6 is an inside view of one of the sections of the casing.

Fig. 7 is a detail sectional view taken on the line 7—7 of Fig. 3.

Generally stated, the direction indicator of the present invention comprises an indicating member, a casing, means for supporting the casing for pivotal movement in a vertical plane, means carried by the casing supporting the indicating member for pivotal movement with respect to the casing into and out of the same, means for effecting the pivotal movement of the casing, means for effecting the pivotal movement of the indicating member in response to the operation of the means which effects the pivotal movement of the casing, and means which limits the movement of the casing to substantially ninety degrees in opposite directions to insure the disposition of the casing either horizontally or vertically.

Referring now more particularly to the several views of the drawing, it will be apparent that, there is shown at 10 a portion of the left hand post of a windshield of an automobile. Extending substantially laterally and horizontally from the post 10 and secured thereto, and braced as at 11 is an arm 12. A casing 13 is carried by the arm 12 for pivotal movement with respect thereto. The casing 13 consists of two sections 14 and 15, which are substantially similar in construction, being dished to form a space 16 which opens through one side and partly through both ends of the casing as at 17. The sections 14 and 15 of the casing are detachably held together by a spacer 18 which receives the screws 19 in threaded bores in the spacer 18, the screws 19 extending through portions of the sections 14 and 15 respectively at one end, and a combined spacer and bushing 20 which accommodates screws 21 in a threaded bore, the screws 21 extending through portions of the sections 14 and 15 respectively at the opposite end of the casing.

The means for supporting the casing 13 for pivotal movement consists of a bushing 22 which extends through the arm 12 and the section 14 of the casing centrally thereof, and a screw 23 threaded into a bore in the bushing 22, there being a suitable washer 24 arranged between the arm 12 and the head of the screw 23.

The means for effecting the pivotal movement of the casing includes a bell crank lever 25 carried by the post 10, the fulcrum of the lever being indicated at 26 and the said lever having a knob 27. A rod or connecting member 28 is employed and is pivotally connected as at 29 to the lever 25, and said connecting member 28 is pivotally connected as at 30 to a plate 31 which is secured in any suitable manner to the section 14 of the casing 13. The pivot 30 may extend through the section 14, as well as through the plate 31. In that case it will not be necessary to secure the plate 31 to the section 14. The plate 31 has a boss 32 which reduces friction. The provision of the plate 31 with the boss 32 serves to maintain the casing 13 in spaced relationship with respect to the arm 12.

An indicating member 33 is provided which has one end thereof shaped to simulate a hand and having a pointing index finger 34. The end of the indicating member 33 opposite to that embodying the hand has a hole therein which accommodates a portion of the bushing 20 on which the indicating member thus pivots or turns. The indicating member 33 is of such proportion that it may be located wholly within the space 16 of the casing 13, and is adapted to move in the space 17 provided between the sections 14 and 15. It will therefore be obvious that the indicating member at times will be housed and be protected from the elements of weather. The indicating member 33 may also be extended as shown in Figs. 2 and 3 externally of the casing 13, the casing 13 combining therewith to bring the indicating member out a considerable distance so as to be disposed in a conspicuous position to operators of vehicles behind.

The means serving for effecting the movement of the indicating member 33 to the indicating position externally of the casing 13, and for effecting the movement of the indicating member to the non-indicating position within the casing 13, includes a gear 35, in the present instance formed integral with the bushing 22. This gear 35 is held stationary by pins 36 carried by the arm 12. The gear 35 may be held in any other way against turning movement. Gear 37 is employed and is mounted for rotation on a stub shaft 38 carried by the casing section 14. The gear 37 meshes with the gear 35, and is an idler. A third gear 39 is secured in any suitable manner to the indicating member 33. The gear 39 rotates on a portion of the bushing 20 and with the shoulder 40 on the bushing 20 serves to maintain the indicating member 33 properly disposed so as to move into and out of the space 17. The gear 39 meshes with the idler gear 37. It follows, that when the casing 13 is moved, movement will be imparted to the indicating member 33 by virtue of the intervention of the gears 35, 37 and 39. The direction of movement of the indicating member 33 is dependent upon the direction of movement of the casing 13. When the casing 13 is moved to a horizontally disposed position as shown in Figs. 2 and 3, the indicating member 33 will be moved externally of the casing 13 to an indicating position, whereas, when the casing 13 is moved to a vertically disposed position as shown in Figs. 1 and 4, the indicating member 33 will be moved in an opposite direction to be disposed within the casing 13.

The means for limiting the movement of the casing 13 substantially to ninety degrees, and to insure its being brought to either a horizontally disposed position or to a vertically disposed position, consists of the pins 36 hereinbefore mentioned. The pins 36 extend respectively through arcuate slots 41 in the section 14 of the casing 13. Each pin 36 engages the opposite end walls of its slot 41 for the limiting action. Attention is called to the fact that the indicating member 33 will also be limited in its movements in virtue of the employment of the pins 36, because the amount of movement of the gears 37 and 39 is controlled in accordance with the amount of movement of the casing 13.

The section 15 of the casing 13 is the rear section, and has arranged thereon a mirror 42 for the usual purposes.

From the foregoing, it will be apparent that, by manipulating the knob 27 it is possible to bring about the desired signaling operations to indicate to operators of following vehicles the course to be followed by the operator of the signaling automobile; and that the signaling or indicating operations will be carried out by a simple and practical device, which will be reliable, and which will be easy to operate.

I claim:

1. In a direction indicator, a movable casing, an indicating member, means carried by the casing supporting the indicating member for pivotal movement, said indicating member adapted to move into and out of said casing through an opening in the casing, a gear carried by the indicating member, an idler gear carried by the casing in mesh with the first mentioned gear, a gear surrounding the pivot of the casing secured against rotational movement, and in mesh with the idler gear.

2. A direction indicator comprising a casing, means supporting the casing for movement, an indicating member, means on the casing supporting the indicating member for movement, said indicating member adapted to move into and out of the casing through an opening in the casing, means for effecting the movement of the casing consisting of a lever and a member pivotally connected with the lever and the casing; and means operated by the movement of the casing for effecting the movement of the indicating member into and out of the casing consisting of a gear carried by the indicating member, an idler gear rotatably carried by the casing, said idler gear being in mesh with the first mentioned gear, and a gear surrounding the pivot of the casing secured against rotational movement and in mesh with the idler gear.

GEORGE A. CUMMINGS.